(12) United States Patent
Kodaka et al.

(10) Patent No.: US 7,044,697 B2
(45) Date of Patent: May 16, 2006

(54) CUTTING TOOL FOR SIMULTANEOUS FACING AND GROOVING OF CMP PAD

(75) Inventors: Ichiro Kodaka, Berkeley, CA (US); Takuya Nagamine, Tokyo (JP); Toshihiro Kobayashi, Tokyo (JP)

(73) Assignee: MIPOX International Corporation, Hayward, CA (US)

( * ) Notice: Subject to any disclaimer, the term of this patent is extended or adjusted under 35 U.S.C. 154(b) by 105 days.

(21) Appl. No.: 10/798,197

(22) Filed: Mar. 10, 2004

(65) Prior Publication Data

US 2005/0201840 A1    Sep. 15, 2005

(51) Int. Cl.
*B23D 13/00* (2006.01)
(52) U.S. Cl. .................. 409/304; 409/308; 407/113
(58) Field of Classification Search .............. 409/304, 409/297, 298, 300, 301, 302, 303, 308; 407/113, 407/114, 115, 116, 117
See application file for complete search history.

(56) References Cited

U.S. PATENT DOCUMENTS

| 373,680 | A | * | 11/1887 | Morton | .............. | 409/304 |
|---|---|---|---|---|---|---|
| 1,514,842 | A | * | 11/1924 | Evans | .............. | 409/304 |
| 4,051,752 | A | * | 10/1977 | Cawley | .............. | 409/304 |
| 4,147,089 | A | * | 4/1979 | Winter et al. | .............. | 409/308 |
| 4,523,364 | A | * | 6/1985 | Laws et al. | .............. | 409/304 |
| 4,626,153 | A | * | 12/1986 | Ergert et al. | .............. | 409/304 |
| 5,305,506 | A | * | 4/1994 | Forman | .............. | 409/304 |
| 5,975,812 | A | | 11/1999 | Friedman | | |
| 6,328,504 | B1 | | 12/2001 | Kinukawa | | |
| 2004/0234349 | A1 | * | 11/2004 | Ueda et al. | .............. | 407/113 |

FOREIGN PATENT DOCUMENTS

| GB | 1 402 946 | 8/1975 |
|---|---|---|
| WO | WO 02/30601 A1 | 4/2002 |

OTHER PUBLICATIONS

26th Edition Machinery's Handbook, 2000, Industrial Press Inc. New York, p. 703, Table 1.*
Patent Application No. PCT/US2005/007019, International Search Report mailed Aug. 1, 2005.
Patent Application No. PCT/US2005/007019, Written Opinion, mailed Aug. 1, 2005.

* cited by examiner

*Primary Examiner*—Boyer D. Ashley
*Assistant Examiner*—Dana Ross
(74) *Attorney, Agent, or Firm*—Beyer Weaver & Thomas LLP

(57) ABSTRACT

A cutting tool for simultaneously carrying out a facing operation and a grooving operation on a target surface has a facing part and a grooving part that protrudes from and may be integrally formed with the facing part. The facing part has a facing surface for carrying out the facing operation and the grooving part has a grooving surface and is for cutting a groove of a specified depth and width on the target surface simultaneously as the cutting tool is moved in a specified forward direction parallel to the target surface. The dimensions of the facing and grooving parts, the roughness of their surfaces, the angles of their cutting edges and the sloping angles of the facing and grooving surfaces with respect to the forward direction are each required to be within a specified range. Where the grooving part protrudes from the facing part, the corners at which the facing surface joins the side surfaces of the grooving part are formed such that each corner has a beveled surface portion.

19 Claims, 2 Drawing Sheets

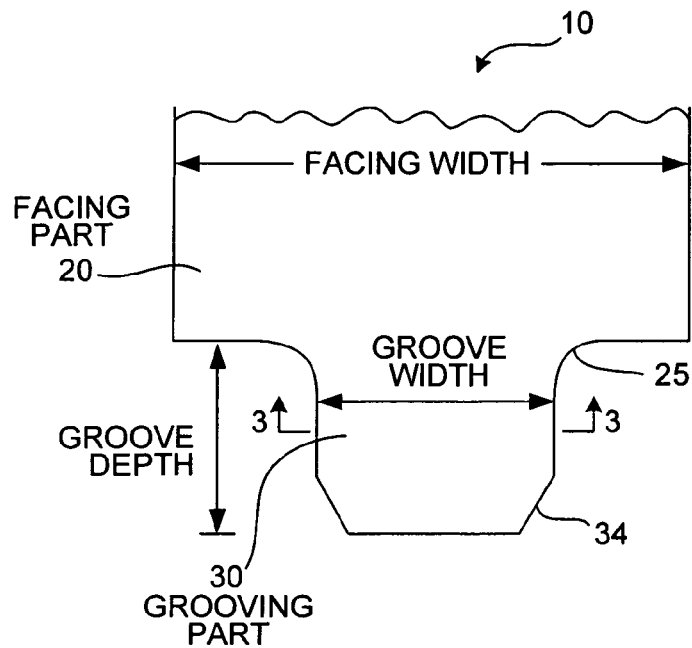
FIG. 1
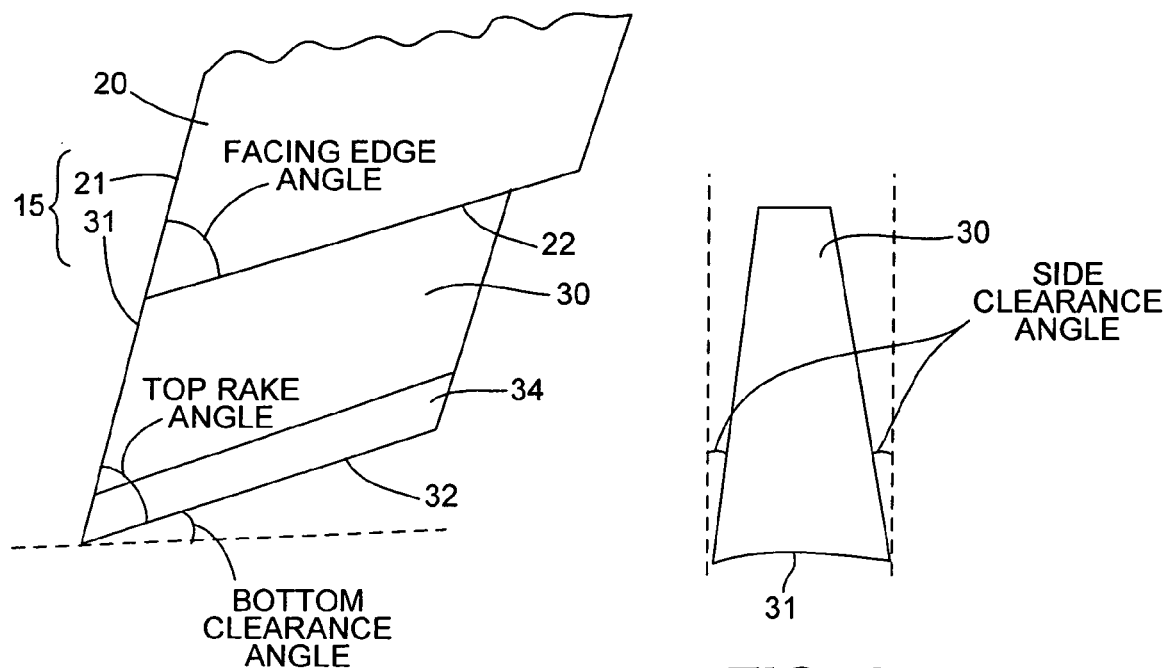
FIG. 2
FIG. 3

CUTTING TOOL FOR SIMULTANEOUS FACING AND GROOVING OF CMP PAD

BACKGROUND OF THE INVENTION

This invention relates to a cutting tool, sometimes more commonly referred to as a cutting insert, for simultaneously facing and grooving a target surface, for example, of a thermoplastic or thermosetting material including non-celled, open-celled and closed-celled elastomers such as urethane particularly suited to be used for creating a planarized polishing surface of a chemical mechanical planarization (CMP) pad with uniform groove dimensions.

A CMP pad is a required element in a CMP process for the planarization of various materials and devices used in the semiconductor and other industries. The CMP pad is a consumable part that is applied on the tool of a CMP equipment. In general a CMP pad has pores and/or groove patterns that act as carriers of chemicals used for planarization and a planarized polishing surface that mechanically assists in the planarization process.

Conventionally, the base material for a CMP pad is individually formed by a cast molding, thermoforming, injection molding or other molding or extrusion process, or individually skived or sliced from a large block of the raw material. Generally a CMP pad is finished by mechanically removing the excess material, creating coplanar surface portions, and a single surface on one side is featured with some groove patterns. The mechanical method for finishing the CMP pad may be by means of a semi-automated or a fully automated CNC lathe, a horizontal milling machine, a vertical milling machine, a cylindrical grinding machine, or arbors with orbital cutting tools in series.

Dimensionally, a CMP pad is required to be of even thickness and without warp. The polishing surface of a CMP pad must satisfy at least the following three requirements. Firstly, it must be provided with a carrier mechanism for the slurry on the CMP pad surface, which can be pores, holes, grooves or other types of topography. Secondly, it must be parallel to the backside of the pad. Thirdly, it must be of a textured roughness without any irregularities such as bumps, burrs, or any other protruding features not only on the surface but also within the carrier mechanism. Carrier mechanisms, such as pores and holes, are usually a characteristic feature of the base material or may be die-punched into the base material. Groove patterns, serving as a carrier mechanism, may be of various dimensions and designs and may be either molded or mechanically cut into the planarized surface.

Individually molded CMP pads may have groove patterns and topography directly molded into the raw material by an injection molding or another molding or casting process. Productivity of CMP pads is greatly enhanced by this process, but there are other problems associated with the direct molding of CMP pads. For the control of even thickness, creating coplanar surface portions, and creating a warp-free CMP pad, the process control for direct molding of CMP pads is very difficult. The roughness and textured surface of a CMP pad are not controllable by direct molding due to the heat and transition of the resin from a liquid state to a solid state. There are also limitations regarding accuracy in the geometry and depth of the groove and topography due to the difficulty in removing the CMP pad from its mold or cast. The same problem limits the flexibility of the CMP pad design and makes it difficult to create different groove geometries and deeper grooves for a longer lasting CMP pad. In a production setting, as a CMP pad is worn and becomes thinner, the desired topography and groove geometry are likely to become lost. As the CMP pad becomes too thin, its grooves may become too shallow to serve as an effective carrier mechanism for the slurry.

The conventional method of mechanically creating a polishing surface of an evenly thick, warp-free CMP pad with coplanar surface portions and a specified groove pattern has been to do it in two separate steps (or processes), that is, the grooving process and the facing process. The order in which these two processes are to be carried out may or may not be important, depending on the methods and accuracy of the mechanical equipment. In conventional machining methods, the separation into these two processes was necessary since they required separate cutting tools or cutting inserts. By having two separate processes, there were inherently the problems of increased cost and inefficiencies in the manufacturing. A two-step manufacturing process requires two sets of tools, maintaining two inventories, changing the tools from one process to the other, prolonging the cycle time due to the tool changes, and reduced productivity due to separate tool calibrations, maintenance, and repairs. The facing and grooving processes are sometimes accomplished with two separate machines. This requires additional capital investment, utilities, facility space, tools, parts, and equipment operators.

Other consequences of conventional machining or mechanical methods of cutting grooves by using conventional cutting inserts include the bumps, burrs, and other protruding or overhanging irregularities that are likely to form on the pad surface or within the groove itself. These irregularities often become the source of loose particulates that may become left on the pad surface or trapped within the groove. The level of these irregularities and particulates may vary from one pad to another, and this causes inconsistency in the performance of CMP pads.

SUMMARY OF THE INVENTION

It is therefore an object of the invention in view of the above to provide an improved cutting tool, such as a cutting insert, capable of simultaneously carrying out facing and grooving operations on a target surface such as a polishing surface of a CMP pad and more particularly such a cutting tool capable of reducing irregularities and imperfections on the target surface such as bumps and burrs and production of particulates.

A cutting tool according to this invention may be characterized as having two parts, which are herein referred to as a facing part and a grooving part. These two parts may be integrally formed as one piece with the grooving part protruding from the facing part. The facing part has a facing surface for carrying out the facing operation and the grooving part has a grooving surface for cutting a groove of a specified depth and width on a specified target surface simultaneously as the cutting tool is moved in a specified forward direction parallel to the target surface.

The dimensions of the facing and grooving parts and the roughness of their surfaces, as well as the angles of their cutting edges and the sloping angles of the facing and grooving surfaces with respect to the forward direction defined as the direction of motion of the cutting tool in actual operation with respect to the target surface are each required to be within a specified range, depending on the physical properties of the target material such as hardness and elasticity. For example, the angles of the cutting edges of the facing and grooving parts, herein respectively referred to as the facing edge angle and the top rake angle, may be even obtuse, depending on the nature of the material, and may be 10°–110°, and the facing and grooving surfaces may have a bottom clearance angle which may be even negative, again depending on the nature of the target material, and is generally required to be within the range of −10°–+80°. The surface roughness of the facing surface is 50–1000 mesh (or microinches) and that of the grooving surface and the side surfaces of the grooving part is 200–3000 mesh (or microinches).

Where the grooving part protrudes from the facing part, each of the corners at which the facing surface joins the side surfaces of the grooving part is formed such that the direction of the surface changes gradually. In other words, each corner has beveled surface portions between the facing and grooving parts such that a groove without unwanted burrs or protrusions can be efficiently produced. This allows cutting of a groove with a dimensionally correct groove with clean corners with no unwanted burrs or protrusions between the inner walls and the target surface.

The grooving part may be formed preferably with a decreasing width in the backward direction for the convenience of cutting a curved groove. The side clearance angle for this case depends on the minimum radius of curvature of the groove to be cut.

In order to make the start of a cutting process easier, the grooving part may be formed further with a tapered bottom portion, say, with a tapering angle less than 30° and a height of less than 0.2 mm.

BRIEF DESCRIPTION OF THE DRAWINGS

FIG. 1 is a front view of a cutting insert embodying this invention.

FIG. 2 is a side view of the cutting insert of FIG. 1.

FIG. 3 is a sectional view of the grooving part of the cutting insert of FIGS. 1 and 2 taken along line 3—3 of FIG. 1.

DETAILED DESCRIPTION OF THE INVENTION

Figure 4:
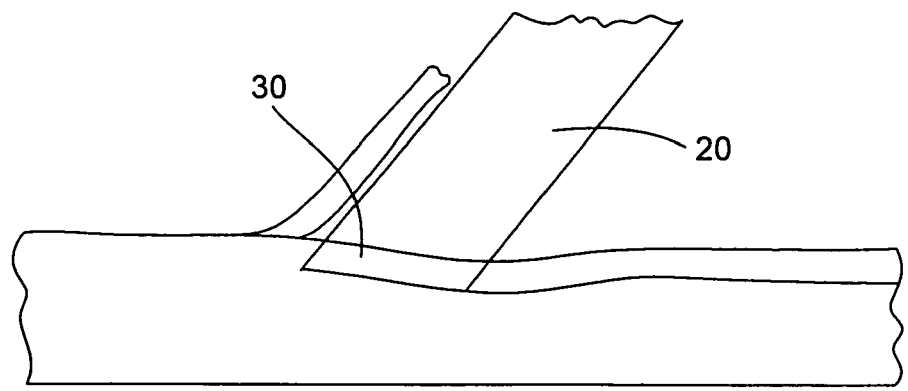
FIG. 4 is a sectional view of a cutting insert with a negative bottom clearance angle while in use.

The invention is described next by way of an example. FIG. 1 is a front view of a cutting insert 10 embodying this invention, and FIG. 2 is its side view. The frontal direction is the direction in which the cutting insert 10 is intended to be moved parallel to and with respect to a target surface (not shown) to be processed thereby. The cutting insert 10 is intended to be fastened to a holder (not shown) when it is used for carrying out a facing and grooving work but this is not intended to limit the scope of the invention. The cutting insert 10 may be formed integrally with its holder. For the convenience of disclosure, however, only the characteristic design feature according to this invention of a cutting insert will be described but cutting tools with a holder part and a cutting part formed in an integrated form are also included within the scope of this invention under a common nomenclature of "cutting tool".

The cutting insert 10, shown in FIGS. 1 and 2 as an example of the cutting tool according to this invention, is of a material, such as high-speed steel and tungsten carbide, that is conventionally used for producing cutting tools and is of a particular design including what are herein referred to as a facing part 20 and a grooving part 30, respectively serving to carry out the facing process and the grooving process on a target surface such as the polishing surface of a CMP pad (not shown).

In FIG. 2, numeral 21 indicates a front surface of the facing part 20 and numeral 31 indicates a front surface of the grooving part 30. The cutting insert 10 according to this example is designed such that the front surfaces of 21 and 31 of the facing and grooving parts 20 and 30 are continuous and may be together simply referred to as the front surface 15 for the convenience of description.

As shown in FIG. 1, the facing part 20 has a width (the "facing width") within the range of 0.2 mm–50 mm, depending on the desired dimensions of the grooves to be formed on the target surface. Throughout herein, the word "width" will be used to denote a dimension in the lateral direction, which is perpendicular to the aforementioned forward direction and parallel to the target surface. The facing part 20 has a bottom surface 22 (the "facing surface") with surface roughness in the range of mesh 50–1000 mesh (or microinches) for carrying out the facing work on the target surface and the grooving part 30 protrudes from a middle portion of this bottom surface 22. The bottom surface 22 and the front surface 21 make a facing edge angle in the range of 10–110° therebetween, depending on the physical characteristic of the material of the target surface to be cut.

The distance, by which the grooving part 30 protrudes from the facing part 20 as seen from the front (as shown in FIG. 1), is herein referred to as the groove depth because this determines the depth to which grooves are intended to be cut into the target surface and may be typically in the range of 0.1–5 mm. The maximum width of the grooving part 30 (as shown in FIG. 1) is herein referred to as the groove width because this determines the width of the grooves intended to be cut and may be typically in the range of 0.1–10 mm. As shown in FIG. 3, the width of the grooving part 30 is the largest at its front surface and decreases gradually in the backward direction. In other words, the side surfaces of the grooving part 30 are not parallel. Their side clearance angles (indicated in FIG. 3) depend on the largest curvature (or the smallest radius of curvature) of a curved pattern of the grooves to be cut. The surface roughness of the side surfaces of the grooving part 30 is in the range of 200–3000 mesh (or microinches).

The grooving part 30 has a bottom surface 32 with surface roughness in the range of 200–3000 mesh (or microinches). The angle between the bottom surface 32 (the "grooving surface") of the grooving part 30 and its front surface 31 may be referred to as the cutting insert's top rake angle 15 and is in the range of 10~110°. FIG. 2 shows an example wherein the front surfaces 21 and 31 of the facing part 20 and the grooving part 31 are coplanar and their bottom surfaces 22 and 32 are parallel to each other such that the facing edge angle and the top rake angle are the same, but this not intended to limit the scope of this invention where the coplanar and parallel surfaces are not exclusively mutual to each other.

The angle between the frontal direction of the cutting insert 10 (or the direction in which it is intended to be moved with respect to the target surface to be processed) may be referred to as the bottom clearance angle and is between −10° and +80°. A cutting insert with a negative bottom clearance angle may be suitable in particular against a certain kind of elastic material as sketched in FIG. 4.

Bottom end portions of the side surfaces 34 of the grooving part 30, away from the portions connecting to the facing part, may preferably be tapered by an angle of 30° or less such that the cutting process can be started more easily. The height of such tapered portions may be typically 0.2 mm or less.

One of main features of this invention relates to the interface at the corners between the facing surface 22 (or the bottom surface of the facing part 20) and the side surfaces of the grooving part 30. Although they are basically perpendicular to each other, they do not make sharp corners where they join. This is because, sharp corners with angles of 90° where the facing part and the grooving part join could not cut a groove with a clean cross-sectional shape without leaving undesirable burrs and protrusions.

Figure 5:
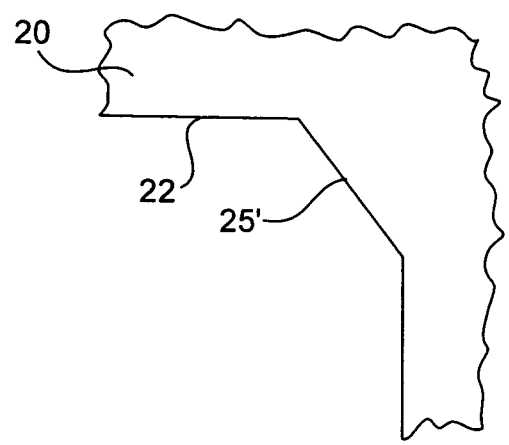
FIG. 5 is a sectional view of a beveled surface portion of another cutting tool embodying this invention.

In order to cut a dimensionally correct groove with clean corners with no unwanted burrs or protrusions, the corners where the side surfaces of the grooving part and the facing surface 22 join are beveled according to this invention, (indicated by numeral 25 in FIG. 1). Although FIG. 1 shows the curved beveled portions 25, when described in terms of their sectional shape, the corners need not be smoothly curved. FIG. 5 shows a straight beveled surface portion 25' for another cutting tool embodying this invention characterized as being flat and oblique with reference to the side surface of the grooving part 30 (and hence also with reference to the cutting surface).

The invention does not impose any stringent requirement on the size of the curved beveled portion 25 as long as it is sufficiently large, say a quarter circle curve with a radius over 0.05 mm. The invention does not impose any stringent requirement on the angle of obliqueness of the straight beveled surface 25' as long as it is sufficiently oblique, say, being in the range of 30°–60°. Neither does the invention impose any stringent requirement on the width of the straight beveled surface 25' (that is, the distance between where it joins the side surface of the grooving part 30 and where it joins the facing surface 22) as long as it is sufficiently large, say, over 0.07 mm in view of the types of material intended to be processed by the tool 10, such that the tool will not operate as if the corners between the side surfaces of the grooving part 30 and the facing surface 22 are not beveled at all.

Figure 6:
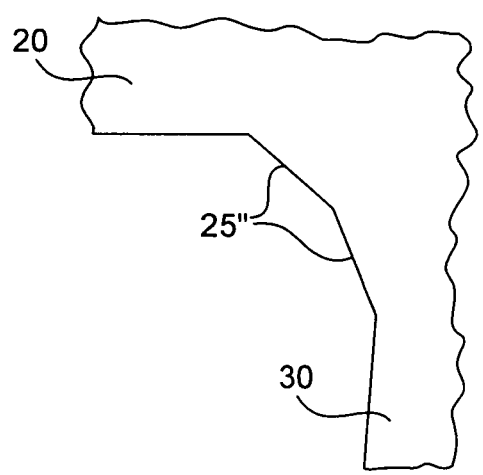
FIG. 6 is a sectional view of a beveled surface portion of still another cutting tool embodying this invention.

The "straight beveled surface portion", required according to this invention between each side surface of the grooving part 30 and the facing surface 22, may consist of two or more mutually adjacent surface parts which are each flat and sufficiently oblique (making an angle in the range of 30°–60° with the side surface of the grooving part 30), as shown in FIG. 6. In the description of the scope of the invention that follows, the expression "width" of a straight beveled surface portion with two or more flat surface parts such as shown in FIG. 6, is intended to mean the sum of the widths of the individual surface parts.

According to experiments by the present inventors, cutting tools not only having a grooving part protruding from the facing surface of a facing part as described above but also having beveled surface portions satisfying the conditions described above at the corners between the facing and grooving parts can not only efficiently finish a surface and cut a groove thereon simultaneously but a groove without unwanted burrs or protrusions can be efficiently produced.

What is claimed is:

1. A cutting tool for simultaneously facing and grooving a target surface by moving in a forward direction defined parallel to said target surface, said cutting tool having a front surface facing said forward direction and comprising a facing part and a grooving part, said facing part and said grooving part each having a bottom surface, the bottom surfaces of said facing part and said grooving part being apart and parallel to each other, making a specified bottom clearance angle, said grooving part protruding from the bottom surface of said facing part, said grooving part and the bottom surface of said facing part joining through beveled surface portions.

2. The cutting tool of claim 1 wherein said beveled surface is smoothly curved with a minimum radius of curvature of 0.05 mm.

3. The cutting tool of claim 1 wherein said beveled surface portion includes one or more mutually adjacent flat surface parts, each of said one or more flat surface parts making 30°–60° with said facing surface.

4. The cutting tool of claim 1 wherein:
said facing part has a width of 0.2–50 mm in a lateral direction parallel to said target surface and perpendicular to said forward direction, and surface roughness of 50–1000 microinches on said facing part bottom surface; and
said grooving part protrudes from said facing bottom surface of said facing part towards said target surface by a groove depth of 0.1–0.5 mm.

5. The cutting tool of claim 2 wherein:
said facing part has a width of 0.2–50 mm in a lateral direction parallel to said target surface and perpendicular to said forward direction, and surface roughness of 50–1000 microinches on said facing part bottom surface; and
said grooving part protrudes from said facing bottom surface of said facing part towards said target surface by a groove depth of 0.1–0.5 mm.

6. The cutting tool of claim 3 wherein:
said facing part has a width of 0.2–50 mm in a lateral direction parallel to said target surface and perpendicular to said forward direction, and surface roughness of 50–1000 microinches on said facing part bottom surface; and
said grooving part protrudes from said facing bottom surface of said facing part towards said target surface by a groove depth of 0.1–0.5 mm.

7. The cutting tool of claim 4 wherein:
said facing front surface makes a facing edge angle of 10°–110° with said bottom surface;
said grooving part has surface roughness 200–3000 microinches on said front surface, side surfaces with surface roughness 200–3000 microinches, a maximum width of 0.1–10 mm in said lateral direction on said front surface and a bottom grooving surface with surface roughness of 200–3000 microinches; and
said bottom grooving surface makes a bottom clearance angle −10°–+80° with said target surface and a top rake angle of 10°–110° with said front surface.

8. The cutting tool of claim 5 wherein:
said facing front surface makes a facing edge angle of 10°–110° with said bottom surface;
said grooving part has surface roughness 200–3000 microinches on said front surface, side surfaces with surface roughness 200–3000 microinches, a maximum width of 0.1–10 mm in said lateral direction on said front surface and a bottom grooving surface with surface roughness of 200–3000 microinches; and
said bottom grooving surface makes a bottom clearance angle of −10°–+80° with said target surface and a top rake angle of 10°–110° with said front surface.

9. The cutting tool of claim 6 wherein:
said facing front surface makes a facing edge angle of 10°–110° with said bottom surface;

said grooving part has surface roughness 200–3000 microinches on said front surface, side surfaces with surface roughness 200–3000 microinches, a maximum width of 0.1–10 mm in said lateral direction on said front surface and a bottom grooving surface with surface roughness of 200–3000 microinches; and said bottom grooving surface makes a bottom clearance angle of −10°–+80° with said target surface and a top rake angle of 10°–110° with said front surface.

10. The cutting tool of claim 7 wherein said grooving part has a gradually decreasing width from said front surface whereby said side surfaces of said grooving part is not parallel, creating a side clearance angle.

11. The cutting tool of claim 8 wherein said grooving part has a gradually decreasing width from said front surface whereby said side surfaces of said grooving part is not parallel, creating a side clearance angle.

12. The cutting tool of claim 9 wherein said grooving part has a gradually decreasing width from said front surface whereby said side surfaces of said grooving part is not parallel, creating a side clearance angle.

13. The cutting tool of claim 7 wherein each of said side surfaces of said grooving has a tapered bottom portion and a tapering angle less than 30° and a height of less than 0.2 mm.

14. The cutting tool of claim 8 wherein each of said side surfaces of said grooving has a tapered bottom portion and a tapering angle less than 30° and a height of less than 0.2 mm.

15. The cutting tool of claim 9 wherein each of said side surfaces of said grooving has a tapered bottom portion and a tapering angle less than 30° and a height of less than 0.2 mm.

16. The cutting tool of claim 10 wherein each of said side surfaces of said grooving has a tapered bottom portion and a tapering angle less than 30° and a height of less than 0.2 mm.

17. The cutting tool of claim 11 wherein each of said side surfaces of said grooving has a tapered bottom portion and a tapering angle less than 30° and a height of less than 0.2 mm.

18. The cutting tool of claim 12 wherein each of said side surfaces of said grooving has a tapered bottom portion and a tapering angle less than 30° and a height of less than 0.2 mm.

19. A method of simultaneously facing a target surface and cutting a groove therein, said method comprising the step of preparing a cutting tool as described in claim 1 and moving said cutting tool parallel to said target surface while contacting said target surface wherein a groove with specified dimensions is cut in said target surface simultaneously as said target surface is polished to a specified surface roughness.

* * * * *